United States Patent
Handley

(10) Patent No.: US 10,834,877 B2
(45) Date of Patent: Nov. 17, 2020

(54) PLANT GROWING SYSTEMS AND METHODS, AND METHODS OF MAKING SUCH SYSTEMS

(71) Applicant: Mont Andrew Handley, Crown Point, IN (US)

(72) Inventor: Mont Andrew Handley, Crown Point, IN (US)

( * ) Notice: Subject to any disclaimer, the term of this patent is extended or adjusted under 35 U.S.C. 154(b) by 472 days.

(21) Appl. No.: 15/727,808

(22) Filed: Oct. 9, 2017

(65) Prior Publication Data

US 2018/0098509 A1  Apr. 12, 2018

Related U.S. Application Data

(60) Provisional application No. 62/405,541, filed on Oct. 7, 2016.

(51) Int. Cl.

| *A01G 22/00* | (2018.01) |
| *G06K 17/00* | (2006.01) |
| *G06K 19/077* | (2006.01) |
| *A01G 9/029* | (2018.01) |
| *A01G 9/00* | (2018.01) |

(52) U.S. Cl.
CPC .............. *A01G 22/00* (2018.02); *A01G 9/006* (2013.01); *A01G 9/0291* (2018.02); *G06K 17/00* (2013.01); *G06K 19/077* (2013.01)

(58) Field of Classification Search
CPC ........ A01G 9/102; A01G 22/00; A01G 9/006; A01G 9/0291; A47G 19/027
USPC ......... 47/66.6, 74; 340/572.1, 572.8, 539.13, 340/539.22, 57, 568.5, 825.36; 700/115, 700/116, 213, 214, 215, 225, 229, 281, 700/300
See application file for complete search history.

(56) References Cited

U.S. PATENT DOCUMENTS

| 3,372,018 A | * | 3/1968 | Stocker | .................. A01G 9/021 71/21 |
| 5,908,135 A | * | 6/1999 | Bradford | ............... B29C 66/112 220/673 |
| 6,164,537 A | * | 12/2000 | Mariani | .................. A01G 9/143 235/383 |
| 6,268,796 B1 | * | 7/2001 | Gnadinger | ......... G06K 19/0726 257/673 |

(Continued)

*Primary Examiner* — Ebony E Evans
(74) *Attorney, Agent, or Firm* — Hartman Global IP Law; Gary M. Hartman; Domenica N.S. Hartman

(57) ABSTRACT

Systems and methods suitable for growing, identifying, and tracking plugs and plants using radio-frequency identification (RFID) devices, as well as methods for making such systems. Such a method includes providing a biodegradable pot assembly and a non-biodegradable RFID module. The pot assembly has an assembly basewall and assembly sidewalls contiguous with the assembly basewall to define a cavity within the pot assembly. The RFID module is embedded within the assembly basewall, has openings therethrough, and comprises an RFID device configured to communicate with an RFID reader and store information identifying the pot assembly. The roots of a seedling grown in a growing medium within the pot assembly grow through and entangle the RFID module. Data is stored on the RFID device to identify the seedling, and an RFID reader is used to communicate with the RFID device to receive the data from the RFID device and identify the seedling.

17 Claims, 3 Drawing Sheets

(56) References Cited

U.S. PATENT DOCUMENTS

| | | | |
|---|---|---|---|
| 7,506,472 B2* | 3/2009 | Leyns | A01G 9/143 |
| | | | 47/1.01 P |
| 8,522,431 B2* | 9/2013 | Finn | G06K 19/07722 |
| | | | 29/600 |
| 8,836,504 B2* | 9/2014 | Kohler | A01G 7/00 |
| | | | 340/540 |
| 9,271,454 B1* | 3/2016 | Shochat | A01G 27/003 |
| 10,600,131 B1* | 3/2020 | Koenig | G06Q 50/02 |
| 2004/0036484 A1* | 2/2004 | Tamai | G01N 27/225 |
| | | | 324/663 |
| 2008/0111696 A1* | 5/2008 | Chisholm | B65D 23/14 |
| | | | 340/572.8 |
| 2009/0292042 A1* | 11/2009 | Patterson | A01G 9/021 |
| | | | 523/123 |
| 2011/0050431 A1* | 3/2011 | Hood | G01N 33/14 |
| | | | 340/603 |
| 2011/0114647 A1* | 5/2011 | Hallberg | B65D 41/04 |
| | | | 220/592.17 |
| 2013/0305606 A1* | 11/2013 | Lonsdale | A01G 9/02 |
| | | | 47/66.6 |
| 2014/0250783 A1* | 9/2014 | Keller | A01G 9/0291 |
| | | | 47/74 |
| 2014/0305927 A1* | 10/2014 | Alexander | A47J 41/0044 |
| | | | 219/387 |
| 2018/0132643 A1* | 5/2018 | Shklar | A47G 23/16 |

\* cited by examiner

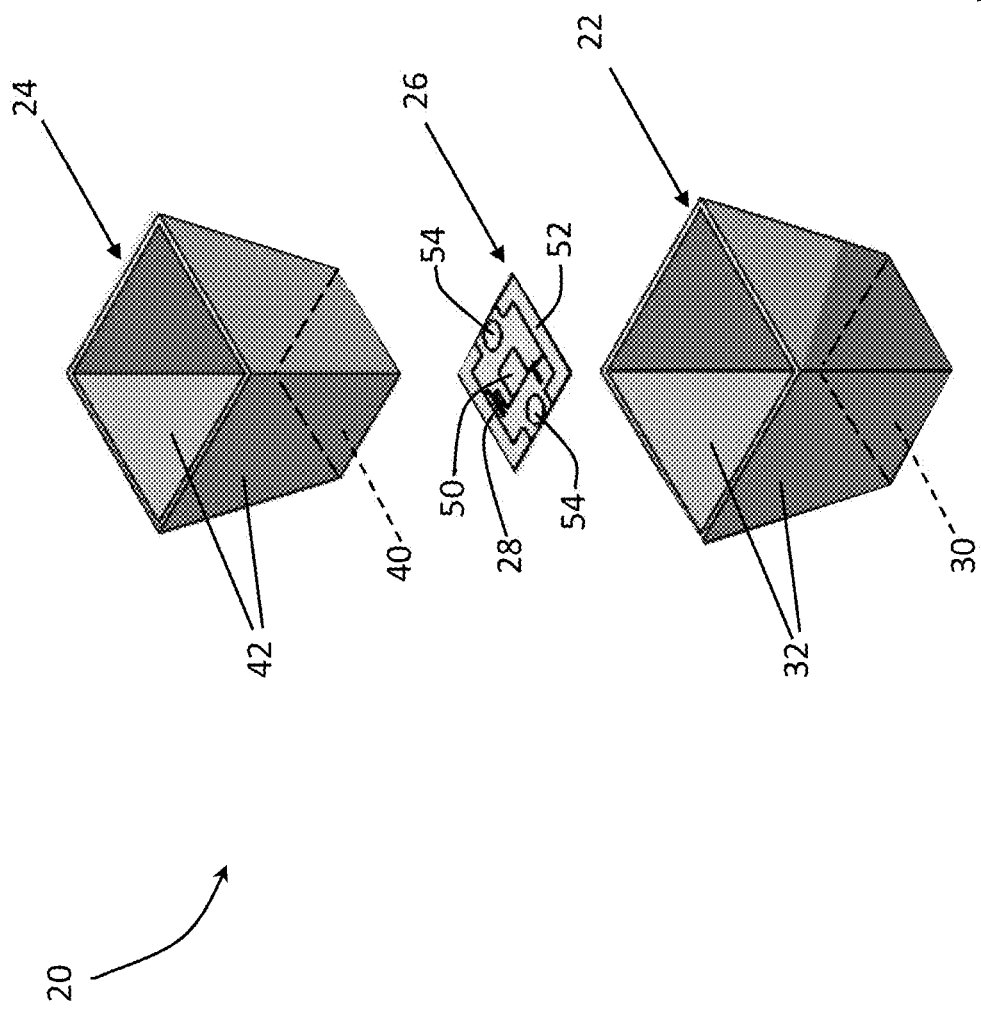

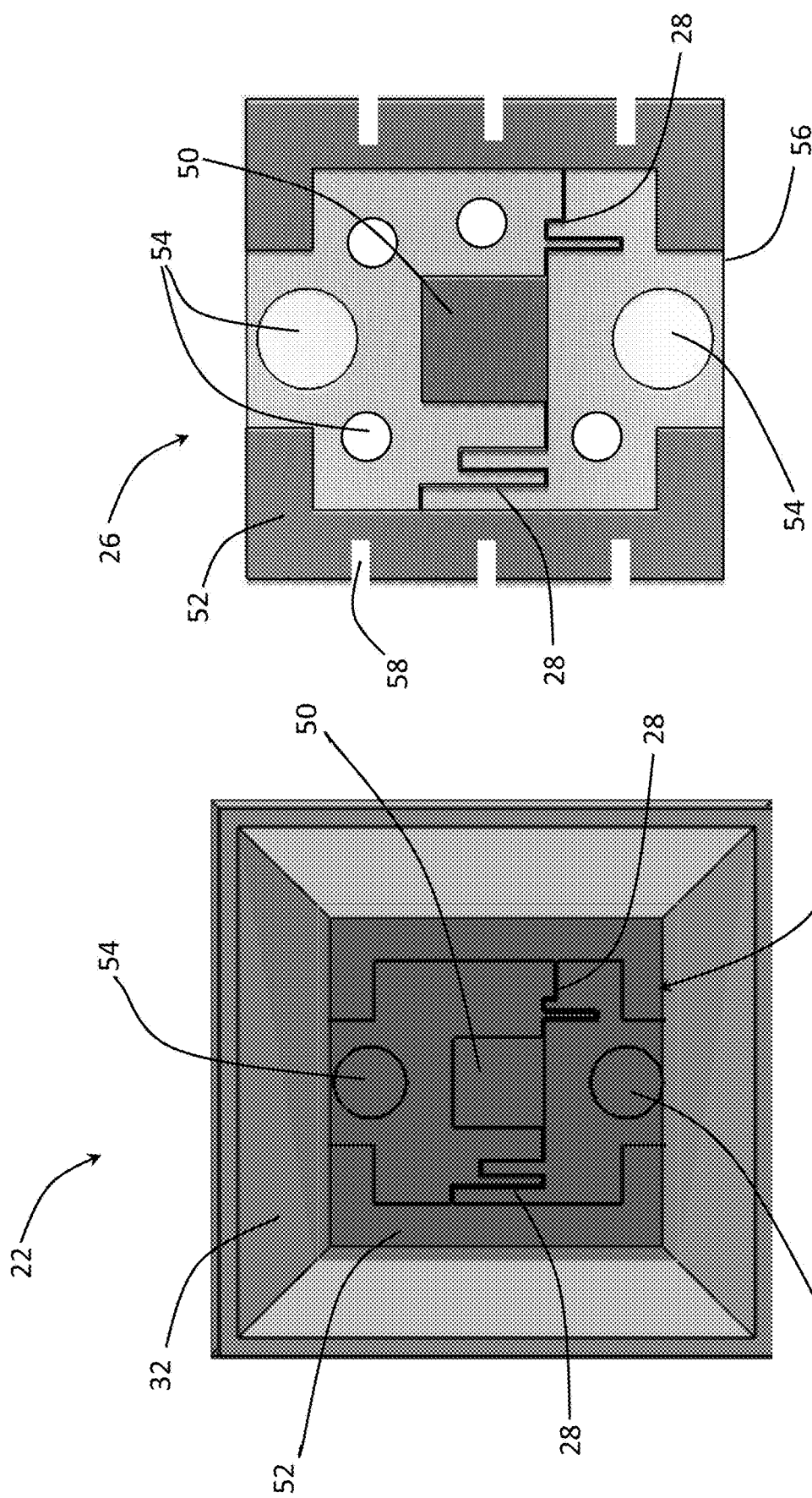

US 10,834,877 B2

PLANT GROWING SYSTEMS AND METHODS, AND METHODS OF MAKING SUCH SYSTEMS

CROSS REFERENCE TO RELATED APPLICATIONS

This application claims the benefit of U.S. Provisional Application No. 62/405,541, filed Oct. 7, 2016, the contents of which are incorporated herein by reference.

BACKGROUND OF THE INVENTION

The present invention generally relates to systems, materials, and methods for growing seedlings at an early stage in a plant's growth. The invention particularly relates to systems and methods for growing seedlings in growing media, and for identifying and tracking such media and plants grown therein throughout the lives of the plants.

Various systems exist for growing seedlings in controlled environments at early stages in a plant's growth before being transplanted to another and perhaps more permanent location. Such systems may make use of what is generally referred to as "peat pots," which are available in various forms. One form of peat pot is typically a fibrous container formed of a biodegradable material, in which a growing (rooting) medium (e.g., a potting mixture) is placed. Another form is a mass of biodegradable growing medium typically confined in a mesh of biodegradable material, such as represented in FIG. 1. Though commonly referred to as "peat pots," materials other than peat can be and are used to form the containers and growing media of peat pots. Other systems for growing seedlings include trays with individual cells containing a growing medium. Plants started with systems of the types described above are commonly referred to as plugs, and are effectively containerized transplants that enable a plant to be transplanted with its roots and growing medium intact.

Some commercial horticulture operations grow plants from seeds or cuttings until the plants are ready for sale. However, in recent decades the horticultural industry has seen a growth in plug producers who ship plugs at an early stage of plant growth to commercial growers, who transplant the plugs and finish growing the plants. In many cases, it is much more economical for commercial growers to purchase plugs than it is to grow the seedlings themselves, especially in northern climates where heating greenhouses during the winter months can be cost prohibitive.

It is believed that the same economic model will eventually be implemented in the medical and recreational cannabis market. However, current laws generally require every cannabis plug grown by one operation and shipped to another to be registered with the appropriate state and federal authorities. Currently available methods of identifying and tracking cannabis plugs include providing a bar code or other identification marker on the plug and storing information about the plug in a database that correlates such information to the plug's unique identification marker. However, these systems may be susceptible to intentional or accidental inaccuracies, for example, if an identification marker on a specific plant is lost or falsified.

In view of the above, it can be appreciated that there is an ongoing desire for systems and methods capable of identifying and tracking plugs and plants, with the ability to do so throughout the life cycles of the plants.

BRIEF DESCRIPTION OF THE INVENTION

The present invention provides systems and methods suitable for growing, identifying, and tracking plugs and plants using radio-frequency identification (RFID) devices, as well as methods for making such systems.

According to one aspect of the invention, a plant growing system includes a biodegradable pot assembly have an assembly basewall and assembly sidewalls contiguous with the assembly basewall to define a cavity in the pot assembly that has an opening opposite the assembly base. The cavity is configured to accommodate a growing medium adapted to grow a seedling therein. The pot assembly comprises a biodegradable outer liner and a biodegradable inner liner that is sized and shaped to be received in the outer liner. Each of the inner and outer liners has a bottom wall that together form the assembly basewall of the pot assembly, and either or both of the inner and outer liners has multiple liner sidewalls contiguous with the bottom wall thereof so as to define at least a portion of the assembly sidewalls of the pot assembly. The system further includes a non-biodegradable radio-frequency identification (RFID) module located within the assembly basewall or the assembly sidewalls and between the inner and outer liners. The RFID module comprises an RFID device configured to communicate with an RFID reader and store information identifying the pot assembly, and in so doing, a seedling growing in the pot assembly (which together may be referred to as a plug). The RFID module has openings therethrough that enable roots of a seedling growing in the cavity to grow through the bottom wall of the inner liner, through the RFID module to entangle the module, and then through the bottom wall of the outer liner.

According to another aspect of the invention, a method of identifying a plant is provided that includes providing a biodegradable pot assembly and a non-biodegradable RFID module. The pot assembly has an assembly basewall and assembly sidewalls contiguous with the assembly basewall to define a cavity in the pot assembly that has an opening opposite the assembly basewall. The RFID module is embedded within the assembly basewall or the assembly sidewalls, has openings therethrough, and comprises an RFID device configured to communicate with an RFID reader and store information identifying the pot assembly. The method further involves placing a growing medium in the cavity, and growing a seedling in the growing medium so that roots of the seedling grow through and entangle the RFID module. Data is stored on the RFID device to identify the seedling, and an RFID reader is used to communicate with the RFID device to receive the data from the RFID device and identify the seedling.

Another aspect of the invention is to make a plant growing system. The method uses a biodegradable outer liner and a biodegradable inner liner that is sized and shaped to be received in the outer liner. Each of the inner and outer liners has a bottom wall and multiple liner sidewalls contiguous with their corresponding bottom walls. The method further includes placing a non-biodegradable radio-frequency identification (RFID) module in the outer liner at the bottom wall thereof. The RFID module has openings therethrough and includes an RFID device configured to communicate with an RFID reader and store information identifying the pot assembly and in so doing a seedling growing in the pot assembly. The inner liner is then placed in the outer liner so that together the inner and outer liners form a biodegradable pot assembly, the bottom walls of the inner and outer liners together form an assembly basewall of the pot assembly, the RFID module is embedded within the assembly basewall or the assembly sidewalls and between the inner and outer liners, and the multiple liner sidewalls of the inner and outer liners together form assembly sidewalls of the pot assembly that are contiguous with the assembly basewall to define a cavity in the pot assembly that has an opening opposite the assembly basewall. The cavity is configured to accommodate a growing medium adapted to grow a seedling therein, and the openings in the RFID module enable roots of a seedling growing in the cavity to grow through the inner liner, through the module to entangle the module, and then through the outer liner.

Technical effects of the systems and methods described above include the ability to identify and track plugs and plants via RFID devices embedded within a container in which the plant is growing. The RFID devices are capable of providing machine-readable data signals, which can be used to reduce human labor and promote the use of automated equipment and industrial robotics. As such, the systems and methods described above are capable of being compatible with cyber-physical systems (CPS) for use in an automated horticulture industry.

Other aspects and advantages of this invention will be further appreciated from the following detailed description.

BRIEF DESCRIPTION OF THE DRAWINGS

FIG. 3 schematically represents an exploded view of another embodiment of a plant growing system comprising a biodegradable pot assembly having a fully-incorporated RFID module embedded in a basewall of the assembly.

FIG. 4 is a top view of an outer liner of the pot assembly of FIG. 3, and shows the RFID module as visible at the bottom of the outer liner.

FIG. 5 is an isolated view schematically representing the RFID module of FIGS. 3 and 4.

DETAILED DESCRIPTION OF THE INVENTION

This disclosure relates to plant growing systems and methods suitable for promoting the identification and/or tracking of plants or plugs grown in a growing medium. As used herein, the term "growing medium" will be used to refer to any suitable type of material (for example, peat, compost, soil, etc., optionally with organic and/or inorganic soil amendments) adapted for rooting seedlings, the term "plug(s)" will be used to refer to a seedling rooted in a growing medium, and the term "pot assembly" will be used to refer to a biodegradable container (as a nonlimiting example, formed of peat) that contains or at least is configured to contain a growing medium, which may be a mass of otherwise loose or friable biodegradable growing medium confined in a biodegradable mesh, to yield a sufficiently containerized unit to enable the seedling to be transplanted with its roots and growing medium intact. The term "biodegradable" is used herein to a material that is capable of biodegrading based on microorganisms converting the material into organic material or natural elements found in nature within a predetermined time period.

Although the invention will be described in relation to plugs, it is within the scope of the invention that systems and methods within the scope of the invention may have other applications, including but not limited to identifying and tracking potted plants that have not been grown from pots, as well as identifying and providing past, present, and future growth and care information about plants grown in any growing medium.

Figure 2:
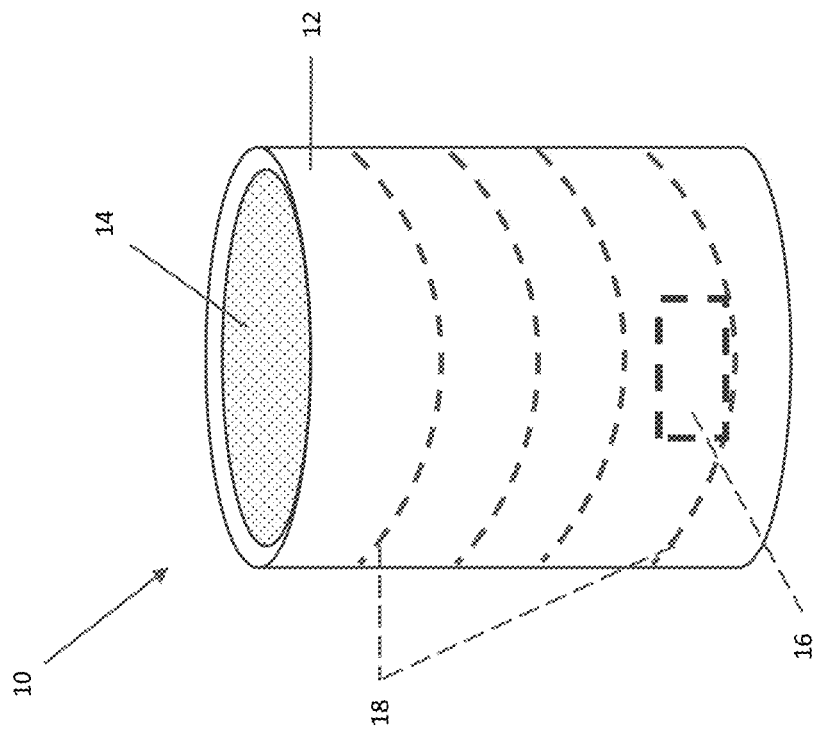
FIG. 2 schematically represents an embodiment of a plant growing system comprising a biodegradable pot assembly having a fully-incorporated RFID module embedded in a sidewall of the assembly.
Figure 1:
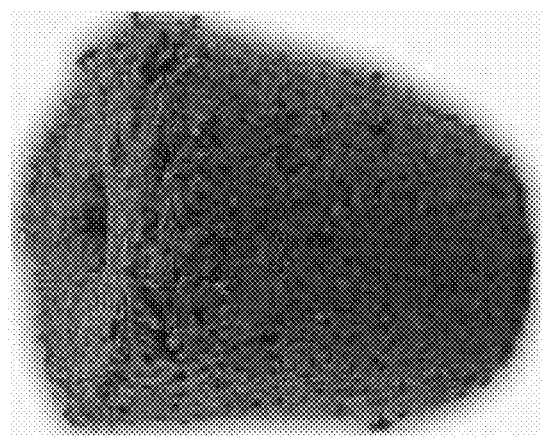
FIG. 1 represents a peat pot comprising a growing medium from which a seedling may grow.

FIG. 2 schematically represents a nonlimiting embodiment of a pot assembly 10 within the scope of the present invention. Similar to conventional peat pots, such as represented in FIG. 1, the pot assembly 10 has a generally cylindrical shape defined by a tubular-shaped sidewall 12 that surrounds and is contiguous with a bottom or basewall (not shown) that closes the lower end of the assembly 10. The sidewall 12 and basewall of the assembly 10 are formed of a biodegradable material, for example, a molded fiber of a type used to produce conventional peat pots. Together, the sidewall 12 and basewall define a cavity within the assembly 10 that is shown in FIG. 2 as containing a growing medium 14. The growing medium 14 may be formed of a biodegradable material suitable for rooting or growing plants and their seedlings. A seed, plant cutting, or the like (not shown) may be placed in the growing medium 14 in order to grow a plant from the pot assembly 10. It is foreseeable that the growing medium 14 may include various types of organic and inorganic soil amendments and be used to grow various types of plants. Such materials and processes are common in the art and will not be discussed in detail herein.

The pot assembly 10 is referred to herein as defining or being part of a plant growing system that further includes a fully integrated radio-frequency identification (RFID) module 16 that provides the capability of identifying and tracking the pot assembly 10, as well as a plant growing in the assembly 10. The RFID module 16 includes an active or passive RFID device (not shown) that may be in the form of a chip, label, or tag and is electromagnetically readable by an RFID reader (not shown) via an antenna 18 functionally connected to the module 16. The RFID device may conventionally comprise an integrated circuit for storing and processing information, modulating and demodulating a radio frequency (RF) signal, collecting DC power from an incident reader signal (if necessary), and various other functions. The antenna 18 is preferably capable of receiving and transmitting an RFID signal over a practical distance, for example, at very close ranges of a few centimeters or over much longer ranges, for example, up to about twenty to thirty meters, depending on the radio frequency of the RFID device being used. The RFID reader may be any type of reader (interrogator) known in the art that is capable of transmitting and receiving a signal to and from the module 16.

FIG. 2 shows the module 16 and its antenna 18 as being integrated into the sidewall 12 of the pot assembly 10. More preferably, the module 16 and antenna 18 are both fully embedded in the sidewall 12 so as not to be visible from the interior or exterior of the assembly 10. Alternatively, the module 16 and/or its antenna 18 may be fully embedded in the basewall of the pot assembly 10, again preferably so as not to be visible from the interior or exterior of the assembly 10. Yet another alternative is to print the antenna 18 directly on a biodegradable mesh fabric, for example, by 3D printing, which could then be applied to the interior surface of the pot assembly 10 within its cavity.

The antenna 18 may be formed of any suitable material, such as but not limited to copper wire. The antenna 18 is represented in FIG. 2 as a wire that spirals around a central vertical axis of the pot assembly 10. In addition to providing a suitably large body capable of interacting with an electromagnetic field, such a configuration can promote growth of a root system of the plant around the antenna 18 such that, as the plant grows, the module 16 and its antenna 18 become intertwined with and relatively inseparable from a plant growing in the pot assembly 10. Although the antenna 18 is represented as coiling upwards through the sidewall 12 of the pot assembly 10, it is foreseeable and within the scope of the invention that the antenna 18 may have any shape and may form any pattern within the pot assembly 10.

The RFID module 16 may include read-only and/or read/write (writeable) memory. Preferably, the module 16 includes a unique identifier, such as but not limited to a serial number, that is used as a key to a database containing information about a plant growing in the growing medium of the pot assembly 10. The module 16 may include additional information including but not limited to the growth history, treatment, and transportation of the plant.

FIG. 2 represents the module 16 as located at or near the basewall or lower end of the pot assembly 10. Such a location may reduce interference with a seed located within the growing medium 14 and a seedling and its root system intended to be grown therein. Unlike bar codes, the module 16 need not be visible on the exterior of the pot assembly 10 or within the line of sight of an RFID reader, but instead may be partially or completely embedded in the sidewall 12 or basewall of the pot assembly 10 so as to be eventually entwined within the root system of a plant growing in the growing medium 14. As a result, the likelihood of the module 16 being removed or tampered with may be significantly reduced, preferably throughout the entire life cycle of the plant and even after the biodegradable sidewall 12 and basewall have decomposed. Since physical access to the module 16 may be and preferably is hindered by its location within the pot assembly 10 and root system of a plant, the RFID device is preferably a passive transponder (UHF RFID Gen2) that does not require a battery and instead can be powered by radio energy transmitted by an RFID reader.

At any time during the life span of the plant, an RFID reader may be used to transmit an encoded radio signal to interrogate the module 16. The module 16 may receive the signal and then respond with its identification and optionally other information. This may be only a serial number, or may be product-related information such as compliance information or other information.

FIG. 3 is an exploded view representing another nonlimiting embodiment of a pot assembly 20 within the scope of the invention. In view of similarities between the embodiments of FIGS. 2 and 3, the following discussion of FIG. 3 will focus primarily on aspects of the embodiment represented therein that differ from the embodiment of FIG. 2 in some notable or significant manner. Other aspects of the embodiment of FIG. 3 not discussed in any detail can be, in terms of structure, function, materials, etc., essentially as was described for the first embodiment.

In this particular embodiment, the pot assembly 20 is an assembly of outer and inner members or liners 22 and 24 that are each preferably a molded fiber material formed of a growing medium or other biodegradable material that has been consolidated. The liners 22 and 24 comprise, respectively, a liner basewall 30 and 40 and multiple liner sidewalls 32 and 42 that are contiguous with their bottom walls 30 and 40 and define therewith a cavity having an opening opposite its basewall 30 or 40, through which a loose growing medium can be placed in the cavity. The liners 22 and 24 are congruous in shape, and the inner liner 24 is preferably sized to be entirely received in the outer liner 22 so that the basewalls 30 and 40 and sidewalls 32 and 42 are in face-to-face contact with each other. The bottom walls 30 and 40 together form an assembly basewall of the pot assembly 20, and the sidewalls 32 and 42 define assembly sidewalls of the pot assembly 20.

FIG. 3 further represents the assembly 20 as comprising a non-biodegradable RFID module 26 to be located within the assembly basewall and between the bottom walls 30 and 40 of the inner and outer liners 22 and 24. As described in reference to the embodiment of FIG. 2, the RFID module 26 comprises an RFID device 50 configured to communicate with an RFID reader (not shown) and store information identifying the pot assembly 20 and, in so doing, a seedling growing in the pot assembly 20. The module 26 differs at least in part from the module 16 of FIG. 2 by having its antenna 28 physically incorporated into its structure. As represented in FIGS. 3, 4, and 5, the RFID device 50 and antenna 28 are fabricated on the surface of a substrate 52, which may be formed of a wide variety of nonbiodegradable materials. To protect the electronic components of the module 26 from a harsh horticultural environment, a lamination film (not shown) may be applied to the surfaces of the module 26 to hermetically seal the RFID device 50 and antenna 28.

As evident from FIGS. 3 and 4, the module 26 is incorporated into the pot assembly 20 by placing the module 26 between the liners 22 and 24, for example, by placing the module 26 on the bottom wall 30 of the outer liner 22 before the inner liner 24 is placed in the outer liner 22, so that the module 26 is between the bottom walls 30 and 40 of the liners 22 and 24 and not visible from the exterior of the pot assembly 20. Openings 54 are formed in the substrate 52 of the module 26, enabling the module 26 to be eventually entwined by the root system of a plant growing in a growing medium placed in the pot assembly 20. In particular, the roots of a seedling will grow through the bottom wall 40 of the inner liner 24, through the openings 54 in the RFID module 26 to entangle the module 26, and then through the bottom wall 30 of the outer liner 22. Thereafter, the plant roots will remain entwined with the module 26 throughout the entire life cycle of the plant, and even after the biodegradable liners 22 and 24 have decomposed. To promote the desired root entanglement, the module 26 represented in FIG. 5 evidences that any number of openings 54 can be incorporated into the substrate 52, and the perimeter 56 of the substrate 52 may be defined by notches, slots, or other discontinuities 58 that further promote the entanglement of the module 26 by plant roots.

It is believed that the above disclosure provides reliable plant growing systems and methods for identifying and tracking pot assemblies 10 and 20 and plants grown therein at any time by communicating with their RFID devices 16 and 26. Such systems and methods may be used to improve distribution and cultivation of plants, and, particularly for government regulated plants such as cannabis, assist in compliance, enforcement, and taxation in accordance with such regulations. In addition, the RFID modules 16 and 26 may be used in combination with other means of identifying and tracking the plant, such as but not limited to bar codes or other identification markers.

While the invention has been described in terms of specific or particular embodiments, it is apparent that other forms could be adopted by one skilled in the art. For example, the pot assemblies 10 and 20 and their components could differ in appearance and construction from the embodiments described herein and shown in the drawings, functions of certain components of the pot assemblies 10 and 20 could be performed by components of different construction but capable of a similar (though not necessarily equivalent) function, appropriate materials could be substituted for those noted, and various methods could be used to manufacture the pot assemblies 10 and 20 and their components. Accordingly, it should be understood that the invention is not necessarily limited to any embodiment described herein or illustrated in the drawings. It should also be understood that the phraseology and terminology employed above are for the purpose of describing the disclosed embodiments, and do not necessarily serve as limitations to the scope of the invention. Therefore, the scope of the invention is to be limited only by the following claims.

The invention claimed is:

1. A plant growing system comprising:
a biodegradable pot assembly have an assembly basewall and assembly sidewalls contiguous with the assembly basewall to define a cavity in the pot assembly that has an opening opposite the assembly basewall, the cavity being configured to accommodate a growing medium adapted to grow a seedling therein, the pot assembly comprising a biodegradable outer liner and a biodegradable inner liner sized and shaped to be received in the outer liner, each of the inner and outer liners having a bottom wall that together form the assembly basewall of the pot assembly, at least one of the inner and outer liners having multiple liner sidewalls contiguous with the bottom wall thereof so as to define at least a portion of the assembly sidewalls of the pot assembly; and
a non-biodegradable radio-frequency identification (RFID) module within the assembly basewall or the assembly sidewalls and between the inner and outer liners, the RFID module comprising a substrate and an RFID device on the substrate, the RFID device being configured to communicate with an RFID reader and store information identifying the pot assembly and in so doing a seedling growing in the pot assembly, the substrate of the RFID module having openings therethrough and having a perimeter with notches and slots therein such that roots of a seedling growing in the cavity grow through the bottom wall of the inner liner, through the openings in the substrate and around the perimeter of the substrate and through the notches and slots therein to entangle the RFID module, and then through the bottom wall of the outer liner.

2. The plant growing system of claim 1, wherein the RFID module is entirely embedded between the bottom walls of the inner and outer liners.

3. The plant growing system of claim 1, wherein each of the inner and outer liners has the multiple liner sidewalls that together form the assembly sidewalls of the pot assembly.

4. The plant growing system of claim 1, wherein the RFID device comprises an antenna at least partially embedded within the RFID module.

5. The plant growing system of claim 4, wherein the antenna is entirely embedded within the RFID module.

6. The plant growing system of claim 4, wherein the antenna is at least partially embedded in the assembly sidewalls.

7. The plant growing system of claim 1, wherein the RFID device comprises a passive tag configured to communicate with and be powered by the RFID reader.

8. The plant growing system of claim 1, further comprising a seedling in the growing medium with the roots thereof through the openings in the substrate and around the perimeter of the substrate and through the notches and slots therein so that the roots are intertwined with the RFID module.

9. A method of identifying a seedling, the method comprising:

providing a biodegradable pot assembly and a non-biodegradable radio-frequency identification (RFID) module, the pot assembly having an assembly basewall and assembly sidewalls contiguous with the assembly basewall to define a cavity in the pot assembly that has an opening opposite the assembly basewall, the RFID module being embedded within the assembly basewall or the assembly sidewalls, the RFID module comprising a substrate and an RFID device on the substrate, the RFID device being configured to communicate with an RFID reader and store information identifying the pot assembly, the substrate of the RFID module having openings therethrough and having a perimeter with notches and slots therein;
placing a growing medium in the cavity;
growing a seedling in the growing medium so that roots of the seedling grow through the openings in the substrate and around the perimeter of the substrate and through the notches and slots therein to entangle the RFID module;
storing data on the RFID device that identifies the seedling; and
communicating with the RFID device via an RFID reader to receive the data from the RFID device and identify the seedling.

10. The method of claim 9, further comprising tracking the seedling during transportation thereof by communicating with the RFID device.

11. The method of claim 9, further comprising powering a passive tag of the RFID device with the RFID reader.

12. A method of making a plant growing system, the method comprising:
providing a biodegradable outer liner and a biodegradable inner liner sized and shaped to be received in the outer liner, each of the inner and outer liners having a bottom wall and multiple liner sidewalls contiguous with the bottom wall thereof;
placing a non-biodegradable radio-frequency identification (RFID) module in the outer liner, the RFID module comprising a substrate and an RFID device on the substrate, the RFID device being configured to communicate with an RFID reader and store information identifying the pot assembly and in so doing a seedling growing in the pot assembly, the substrate of the RFID module having openings therethrough and having a perimeter with notches and slots therein;
placing the inner liner in the outer liner so that together the inner and outer liners form a biodegradable pot assembly, the bottom walls of the inner and outer liners together form an assembly basewall of the pot assembly, the multiple liner sidewalls of the inner and outer liners together form assembly sidewalls of the pot assembly that are contiguous with the assembly basewall to define a cavity in the pot assembly that has an opening opposite the assembly basewall, and the RFID module is embedded within the assembly basewall or the assembly sidewalls and between the inner and outer liners, the cavity being configured to accommodate a growing medium adapted to grow a seedling therein so that roots of the seedling grow through the inner liner, through the openings in the substrate and around the perimeter of the substrate and through the notches and slots therein to entangle the RFID module, and then through the outer liner.

13. The method of claim 12, wherein the RFID module is entirely embedded between the bottom walls of the inner and outer liners.

14. The method of claim 12, wherein the RFID device comprises an antenna at least partially embedded within the RFID module.

15. The method of claim 14, wherein the antenna is entirely embedded within the RFID module.

16. The method of claim 14, wherein the antenna is at least partially embedded in the assembly sidewalls.

17. The method of claim 12, wherein the RFID device comprises a passive tag configured to communicate with and be powered by the RFID reader.

* * * * *